United States Patent
Murphy et al.

(10) Patent No.: US 10,364,915 B2
(45) Date of Patent: Jul. 30, 2019

(54) VALVE SHIFT DETECTION SYSTEMS AND METHODS

(71) Applicant: Schlumberger Technology Corporation, Sugar Land, TX (US)

(72) Inventors: Jeremy Murphy, Sugar Land, TX (US); Kent D. Harms, Richmond, TX (US); Albert Hoefel, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 240 days.

(21) Appl. No.: 14/903,558

(22) PCT Filed: Jul. 9, 2014

(86) PCT No.: PCT/US2014/045916
§ 371 (c)(1),
(2) Date: Jan. 7, 2016

(87) PCT Pub. No.: WO2015/006424
PCT Pub. Date: Jan. 15, 2015

(65) Prior Publication Data
US 2016/0161022 A1     Jun. 9, 2016

Related U.S. Application Data

(60) Provisional application No. 61/844,151, filed on Jul. 9, 2013.

(51) Int. Cl.
*F16K 37/00*     (2006.01)
*E21B 49/10*     (2006.01)
*E21B 34/06*     (2006.01)

(52) U.S. Cl.
CPC .......... *F16K 37/0025* (2013.01); *E21B 34/06* (2013.01); *E21B 34/066* (2013.01);
(Continued)

(58) Field of Classification Search
CPC ......... Y10T 137/8225; Y10T 137/8242; Y10T 137/86493–8671; Y10T 137/8158;
(Continued)

(56) References Cited

U.S. PATENT DOCUMENTS 2,343,087 A * 2/1944 Schlumberger ..... E21B 43/1185
166/53
2,780,813 A * 2/1957 Tritt ...................... H01R 43/04
340/680

(Continued)

FOREIGN PATENT DOCUMENTS

| EP | 1980777 A2 | 10/2008 |
| EP | 1980777 B1 | 8/2011 |
| WO | WO2015006424 A1 | 1/2015 |

OTHER PUBLICATIONS

International Search Report and Written Opinion issued in International Patent application PCT/US2014/045916, dated Oct. 30, 2014. 14 pages.

(Continued)

*Primary Examiner* — Craig J Price

(57) ABSTRACT

The present discloses valve systems that include valve shift detection systems that can be employed to determine when a valve has shifted. In certain embodiments, the valve shift detection systems include a switch integrated into a valve block that may be closed upon shifting of the spool valve. In certain embodiments, the switch may include a component that completes a circuit upon contacting the valve. The valve (Continued)

shift detection systems also may include a controller designed to detect a voltage or current change produced by completing the circuit.

15 Claims, 9 Drawing Sheets

(52) U.S. Cl.
CPC .......... *E21B 49/10* (2013.01); *F16K 37/0041* (2013.01); *Y10T 137/8225* (2015.04); *Y10T 137/8242* (2015.04)

(58) Field of Classification Search
CPC ........... Y10T 137/8275; F16K 37/0025; F16K 37/0041; E21B 34/06; E21B 34/066; E21B 49/10
USPC .......................................... 137/553, 554, 556
See application file for complete search history.

(56) References Cited

U.S. PATENT DOCUMENTS

| | | | |
|---|---|---|---|
| 2,958,340 A * | 11/1960 | Rosebrook | F15B 13/04 137/625.69 |
| 3,079,793 A * | 3/1963 | Le Bus | E21B 49/10 166/100 |
| 3,254,661 A | 6/1966 | Purfurst | |
| 4,276,903 A | 7/1981 | Spohr | |
| 4,341,241 A | 7/1982 | Baker | |
| 4,416,152 A | 11/1983 | Wilson | |
| 4,953,590 A | 9/1990 | Kakinuma et al. | |
| 5,484,352 A * | 1/1996 | Kuma | F16H 59/68 137/554 |
| 5,826,616 A | 10/1998 | Golden | |
| 7,191,831 B2 | 3/2007 | Reid et al. | |
| 7,367,394 B2 | 5/2008 | Villareal et al. | |
| 7,518,523 B2 | 4/2009 | Yaun et al. | |
| 7,788,983 B2 * | 9/2010 | Hansson | G01D 5/14 73/861.08 |
| 8,146,679 B2 | 4/2012 | Downton | |
| 9,657,863 B2 * | 5/2017 | Brennan, III | F16K 31/025 |
| 2008/0202608 A1 | 8/2008 | Tschida et al. | |
| 2011/0011583 A1 | 1/2011 | Niconoff | |
| 2011/0017310 A1 | 1/2011 | Eriksson | |
| 2012/0325322 A1 | 12/2012 | Li et al. | |
| 2014/0060657 A1 | 3/2014 | Brennan, III | |

OTHER PUBLICATIONS

International Preliminary Report on Patentability issued in International Patent application PCT/US2014/045916, dated Jan. 21, 2016. 11 pages.
Examination Report issued in Australian Patent Application 2014287335 dated Jun. 7, 2017. 3 pages.
First Office Action and Search Report issued in Chinese Patent Application 201480039506.1 dated Mar. 3, 2017. 13 pages.
Search Report R 61 issued in European Patent Application 14823008.9 dated Feb. 21, 2017. 3 pages.
Examination Report 94(3) EPC issued in European Patent Application 14823008.9 dated Mar. 3, 2017. 3 pages.
Third Office Action and Search Report issued in Chinese Patent Application 201480039506.1 dated Aug. 27, 2018, 12 pages.
Examination Report 94(3) EPC issued in European Patent Application 14823008.9 dated Mar. 10, 2017. 7pages.
Examination Report 94(3) EPC issued in European Patent Application 14823008.9 dated Mar. 9, 2018, 5 pages.
Examination Report 94(3) EPC issued in European Patent Application 14823008.9 dated Oct. 10, 2018, 5 pages.
International Search Report and the Written Opinion for International Application No. PCT/US2014/045916 dated Oct. 30, 2014.

* cited by examiner

VALVE SHIFT DETECTION SYSTEMS AND METHODS

CROSS-REFERENCE TO RELATED APPLICATIONS

This application claims the benefit of U.S. Provisional Application No. 61/844,151, entitled "Valve Shift Detection Systems and Methods," filed Jul. 9, 2013, which is hereby incorporated herein by reference in its entirety.

BACKGROUND OF THE DISCLOSURE

The disclosure relates generally to valve shift detection systems and methods that can be employed in downhole tools.

Wellbores (also known as boreholes) are drilled to penetrate subterranean formations for hydrocarbon prospecting and production. During drilling operations, evaluations may be performed on the subterranean formation for various purposes, such as to locate hydrocarbon-producing formations and manage the production of hydrocarbons from these formations. To conduct formation evaluations, the drill string may include one or more drilling tools that test and/or sample the surrounding formation, or the drill string may be removed from the wellbore, and a wireline tool may be deployed into the wellbore to test and/or sample the formation. These drilling tools and wireline tools, as well as other wellbore tools conveyed on coiled tubing, drill pipe, casing or other conveyers, are also referred to herein as "downhole tools."

Formation evaluation may involve drawing fluid from the formation into a downhole tool for testing and/or sampling. Various devices, such as probes and/or packers, may be extended from the downhole tool to isolate a region of the wellbore wall, and thereby establish fluid communication with the subterranean formation surrounding the wellbore. Fluid may then be drawn into the downhole tool using the probe and/or packer and a sample of the fluid may be collected in one or more sample chambers or bottles positioned in the downhole tool. A system of valves may be employed to direct the fluid into different sample chambers and to seal the sample chambers downhole.

SUMMARY

The present disclosure relates to a valve system that includes a valve disposed in a housing where the valve includes a spool moveable from an un-actuated position to an actuated position in response to actuation of the valve. The valve system also includes a valve shift detection system disposed in the housing. The valve shift detection system includes a circuit electrically isolated from the valve in the un-actuated position and electrically coupled to the valve in the actuated position.

The present disclosure also relates to a valve system that includes a valve disposed in a valve block and a valve shift detection system disposed in the valve block. The valve includes a spool moveable from an un-actuated position to an actuated position in response to actuation of the valve. The valve shift detection system includes switch component, where the switch component is spaced from the valve by a gap when the valve is in the un-actuated position, and where the switch component contacts the valve to complete a circuit and close the gap when the valve is in the actuated position.

The present disclosure also relates to a method that includes actuating a valve to move a spool from an un-actuated position to an actuated position within a housing, and detecting a successful shift of the spool to the actuated position based on a voltage change or a current change produced by the valve contacting a valve shift detection system disposed in the housing

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the present disclosure provides many different embodiments, or examples, for implementing different features of various embodiments. Specific examples of components and arrangements are described below to simplify the present disclosure. These are, of course, merely examples and are not intended to be limiting.

The present disclosure relates to valve shift detection systems that can be employed to determine when a valve has shifted. The valve shift detection systems described herein may be employed in downhole tools to detect shifting of spool valves. However, in other embodiments, the valve shift detection systems may be employed to detect shifting of spool valves employed in other environments, as well as to detect shifting of other types of valves. According to certain embodiments, the valve shift detection systems may include a switch integrated into a valve block that may be closed upon shifting of the spool valve. In certain embodiments, the switch may include a sensor button or spring contact that completes a circuit upon contacting the valve. The valve shift detection systems also may include a controller designed to detect a voltage or current change produced by completing the circuit.

Figure 1:
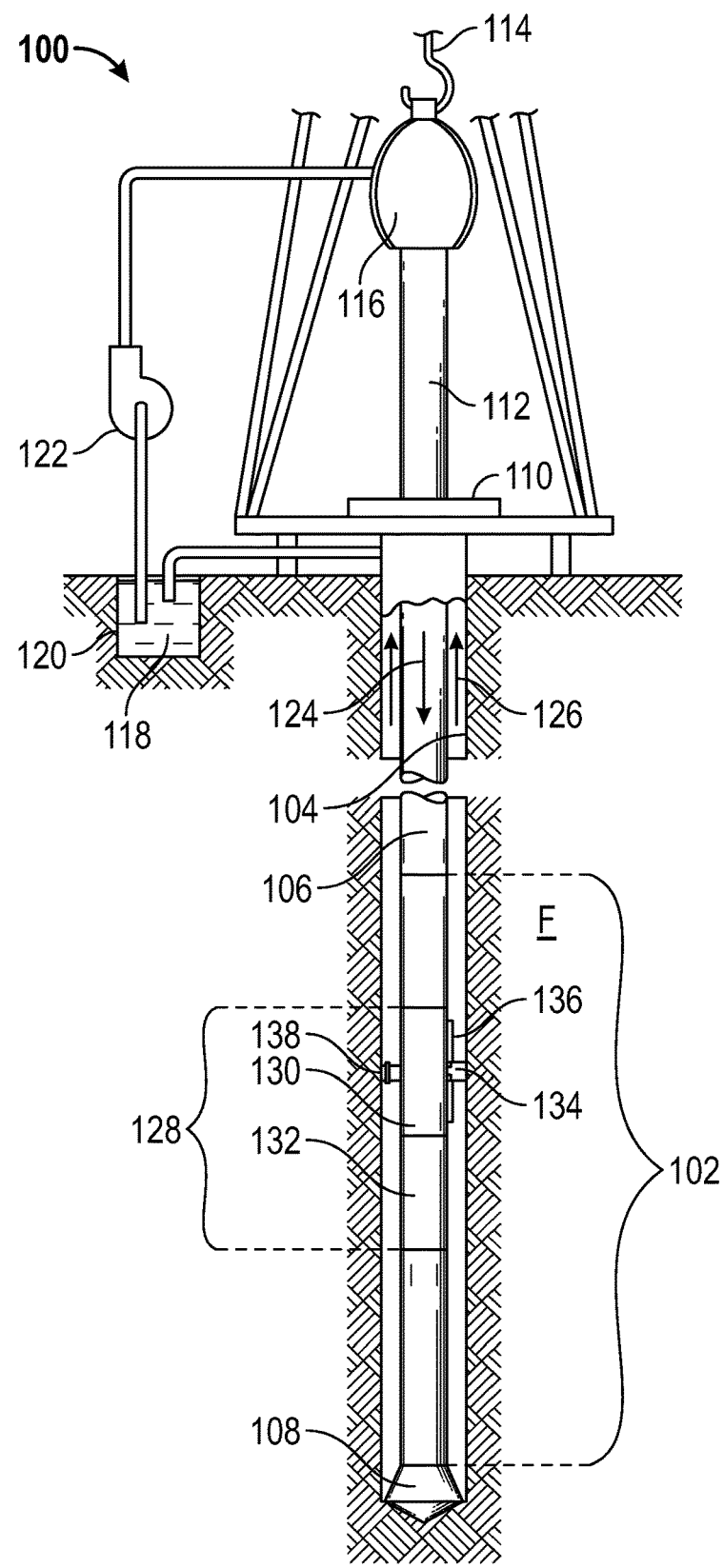
FIG. 1 is a schematic view of an embodiment of a wellsite system that may valve shift detection systems, according to aspects of the present disclosure.
Figure 2:
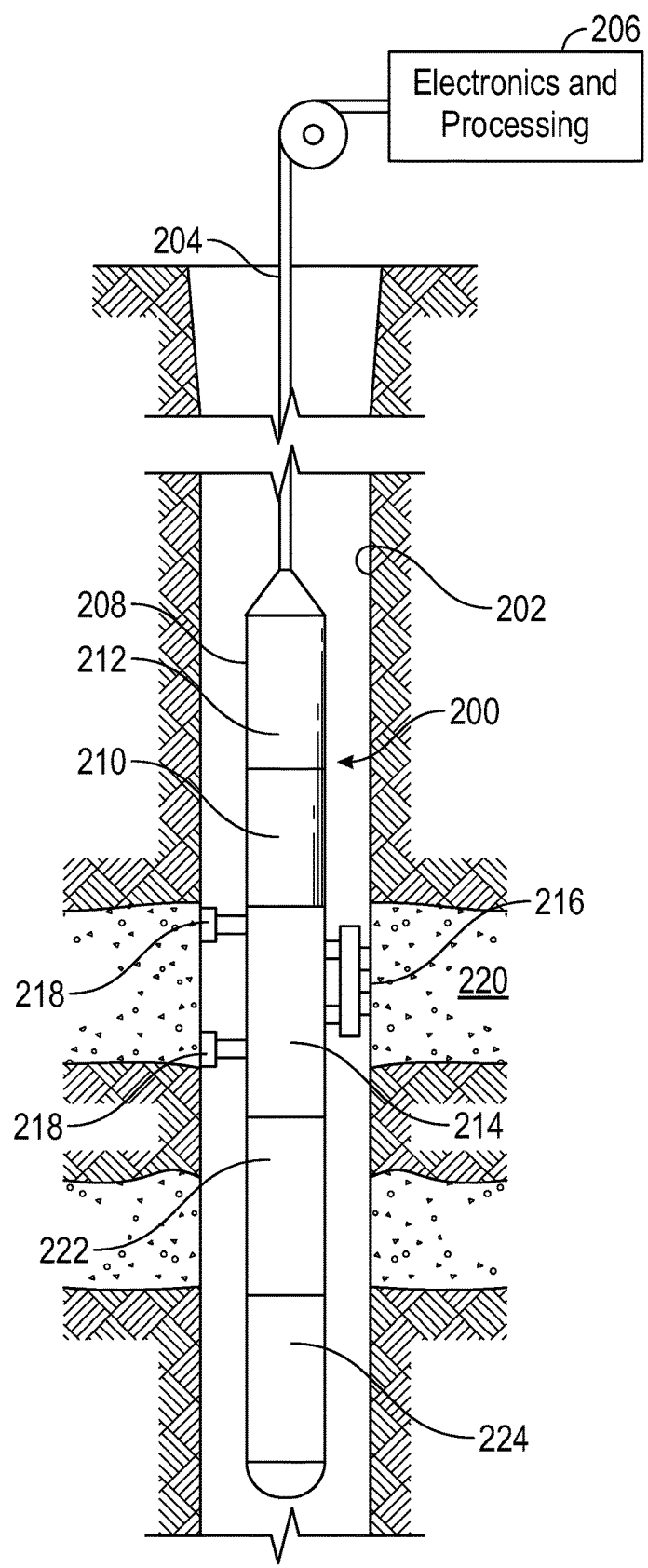
FIG. 2 is a schematic view of another embodiment of a wellsite system that may employ valve shift detection systems, according to aspects of the present disclosure.

FIGS. 1 and 2 depict examples of wellsite systems that may employ the valve shift detection systems and techniques described herein. FIG. 1 depicts a rig 100 with a downhole tool 102 suspended therefrom and into a wellbore 104 via a drill string 106. The downhole tool 100 has a drill bit 108 at its lower end thereof that is used to advance the downhole tool into the formation and form the wellbore. The drillstring 106 is rotated by a rotary table 110, energized by means not shown, which engages a kelly 112 at the upper end of the drillstring 106. The drillstring 106 is suspended from a hook 114, attached to a traveling block (also not shown), through the kelly 112 and a rotary swivel 116 that permits rotation of the drillstring 106 relative to the hook 114. The rig 100 is depicted as a land-based platform and derrick assembly used to form the wellbore 104 by rotary drilling. However, in other embodiments, the rig 100 may be an offshore platform.

Drilling fluid or mud 118 is stored in a pit 120 formed at the well site. A pump 122 delivers the drilling fluid 118 to the interior of the drillstring 106 via a port in the swivel 116, inducing the drilling fluid to flow downwardly through the drillstring 106 as indicated by a directional arrow 124. The drilling fluid exits the drillstring 106 via ports in the drill bit 108, and then circulates upwardly through the region between the outside of the drillstring and the wall of the wellbore, called the annulus, as indicated by directional arrows 126. The drilling fluid lubricates the drill bit 108 and carries formation cuttings up to the surface as it is returned to the pit 120 for recirculation.

The downhole tool 102, sometimes referred to as a bottom hole assembly ("BHA"), may be positioned near the drill bit 108 and includes various components with capabilities, such as measuring, processing, and storing information, as well as communicating with the surface. A telemetry device (not shown) also may be provided for communicating with a surface unit (not shown).

The downhole tool 102 further includes a sampling system 128 including a fluid communication module 130 and a sampling module 132. The modules may be housed in a drill collar for performing various formation evaluation functions, such as pressure testing and sampling, among others. According to certain embodiments, the sampling system 128 may be employed "while drilling," meaning that the sampling system 128 may be operated during breaks in operation of the mud pump 122 and/or during breaks in operation of the drill bit 108. As shown in FIG. 1, the fluid communication module 130 is positioned adjacent the sampling module 132; however the position of the fluid communication module 130, as well as other modules, may vary in other embodiments. Additional devices, such as pumps, gauges, sensor, monitors or other devices usable in downhole sampling and/or testing also may be provided. The additional devices may be incorporated into modules 130 and 132 or disposed within separate modules included within the sampling system 128.

The fluid communication module 130 includes a probe 134, which may be positioned in a stabilizer blade or rib 136. The probe 134 includes one or more inlets for receiving formation fluid and one or more flowlines (not shown) extending into the downhole tool for passing fluids through the tool. In certain embodiments, the probe 134 may include a single inlet designed to direct formation fluid into a flowline within the downhole tool. Further, in other embodiments, the probe may include multiple inlets that may, for example, be used for focused sampling. In these embodiments, the probe may be connected to a sampling flow line, as well as to guard flow lines. The probe 134 may be movable between extended and refracted positions for selectively engaging a wall of the wellbore 104 and acquiring fluid samples from the formation F. One or more setting pistons 138 may be provided to assist in positioning the fluid communication device against the wellbore wall.

FIG. 2 depicts an example of a wireline downhole tool 200 that may employ the systems and techniques described herein. The downhole tool 200 is suspended in a wellbore 202 from the lower end of a multi-conductor cable 204 that is spooled on a winch (not shown) at the surface. The cable 204 is communicatively coupled to an electronics and processing system 206. The downhole tool 200 includes an elongated body 208 that houses modules 210, 212, 214, 222, and 224, that provide various functionalities including fluid sampling, fluid testing, operational control, and communication, among others. For example, the modules 210 and 212 may provide additional functionality such as fluid analysis, resistivity measurements, operational control, communications, coring, and/or imaging, among others.

As shown in FIG. 2, the module 214 is a fluid communication module 214 that has a selectively extendable probe 216 and backup pistons 218 that are arranged on opposite sides of the elongated body 208. The extendable probe 216 is configured to selectively seal off or isolate selected portions of the wall of the wellbore 202 to fluidly couple to the adjacent formation 220 and/or to draw fluid samples from the formation 220. The probe 216 may include a single inlet or multiple inlets designed for guarded or focused sampling. The formation fluid may be expelled to the wellbore through a port in the body 208 or the formation fluid may be sent to one or more fluid sampling modules 222 and 224. The fluid sampling modules 222 and 224 may include sample chambers that store the formation fluid. In the illustrated example, the electronics and processing system 206 and/or a downhole control system are configured to control the extendable probe assembly 216 and/or the drawing of a fluid sample from the formation 220.

Figure 3:
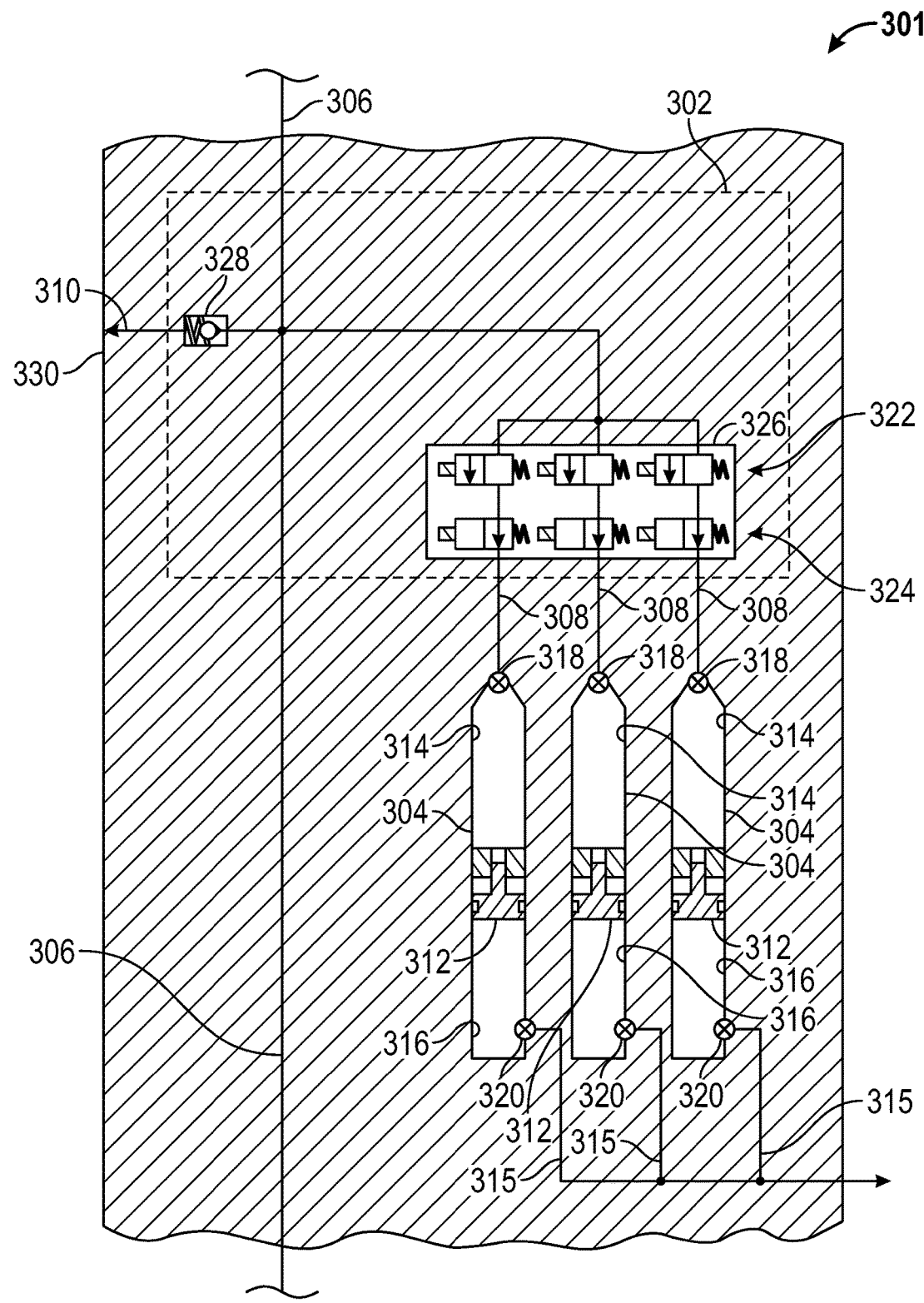
FIG. 3 is a schematic representation of a portion of a sample collection system that includes sample directing valves with valve shift detection systems; according to aspects of the present disclosure.

FIG. 3 is a schematic representation of a portion of a sample collection system 300 that may be employed within a sampling module. For example, the sample collection system 300 may be employed in the sampling modules 132, 222, and 224, described above with respect to FIGS. 1 and 2. Further, the sample collection system 300 may be employed in other downhole tools, such as tools conveyed downhole on wired drill pipe or coiled tubing.

The sample collection system 300 includes a flow diverter 302 for selectively diverting flow through the sampling module and into sample chambers 314 included within the sample collection system 300. The flow diverter 302 selectively diverts fluid from the primary flowline 306 that extends through the sampling module to secondary flowlines 308 that lead to sample chambers 304. The flow diverter 302 also may divert fluid from the primary flowline 306 to an exit flowline 310 leading to the wellbore.

The secondary flowlines 308 branch off from primary flowline 306 and extend to sample chambers 304. The sample chambers may be any type of sample chamber known in the art to capture downhole fluid samples. As shown, the sample chambers include a slidable piston 312 defining a variable volume sample cavity 314 and a variable volume buffer cavity 316. The sample cavity 314 is designed to receive the fluid from the secondary flowlines 308 and to store the fluid sample. The buffer cavity 316 contains a buffer fluid that applies a pressure to the piston 312 to maintain a pressure differential between the cavities 314 and 316 sufficient to maintain the pressure of the sample as it flows into the sample cavity. According to certain embodiments, additional features, such as pressure compensators, pressure chambers, sensors and other components also may be included within the sample chambers 304 as desired.

Each sample chamber 304 includes sample chamber valves 318 and 320. The chamber valves 318 provide selective fluid communications between the sample cavities 314 and the secondary flowlines 308. The chamber valves 320 provide selective fluid communications between the buffer cavities 316 and a pressure source, such as the wellbore, a nitrogen charging chamber, or other pressure source. Each sample chamber 314 is also fluidly coupled to a set of sample directing valves 322 and 324 disposed in a housing, such as a valve block 326, for controlling the flow of fluid into a sample chamber 304.

One or more of the sample directing valves 322 and 324 may be selectively activated, sequentially or independently, to permit fluid from the flowline 310 to enter the sample cavity of one or more of the sample chambers 314. According to certain embodiments, the sample directing valves 322 may be normally closed valves, and the sample directing valves 324 may be normally open valves 324. As discussed further below, the valves 322 and 324 may include a spring-loaded stem (e.g., a spool) that biases the valves to either an open or closed position. The sample directing valves 322 and 324 may be selectively actuated to route the sample fluid into the various sample chambers 304. After a sample of fluid has been collected within a sample chamber 304, the corresponding normally open valve 324 and the corresponding valve 318 may be closed to seal the sample within the sample cavity 314 of the respective sample chamber 304.

In certain embodiments, additional valves may be provided in various locations about the flowlines to permit selective fluid communication between locations. For example, a valve 328, such as a relief or check valve, is disposed in the exit flowline 310 to allow selective fluid communication with the wellbore. For example, fluid may be directed through the exit flowline 310 out of a tool body's sidewall 330 and into the wellbore. The valve 328 also may be set to open to the wellbore at a given differential pressure setting. For example, the valve 328 may be a relief or seal valve that is controlled passively, actively or by a preset relief pressure. The valve 328 may be used to flush the flowline 306 before sampling and/or to prevent over-pressuring of fluid samples pumped into the respective sample chambers 304. The relief valve also may be employed as a safety valve to prevent trapping high pressure at the surface.

One or more of the valves 318, 320, 322, 324, and 328 may be remotely controlled from the surface, for example, by using mud-pulse telemetry, wired drill pipe communications, or a wireline cable, among others. Downhole processors also may be provided for such actuation. Further, in other embodiments, one or more of the valves 318, 320, 322, 324, and 328 may be manually actuated.

Figure 4:
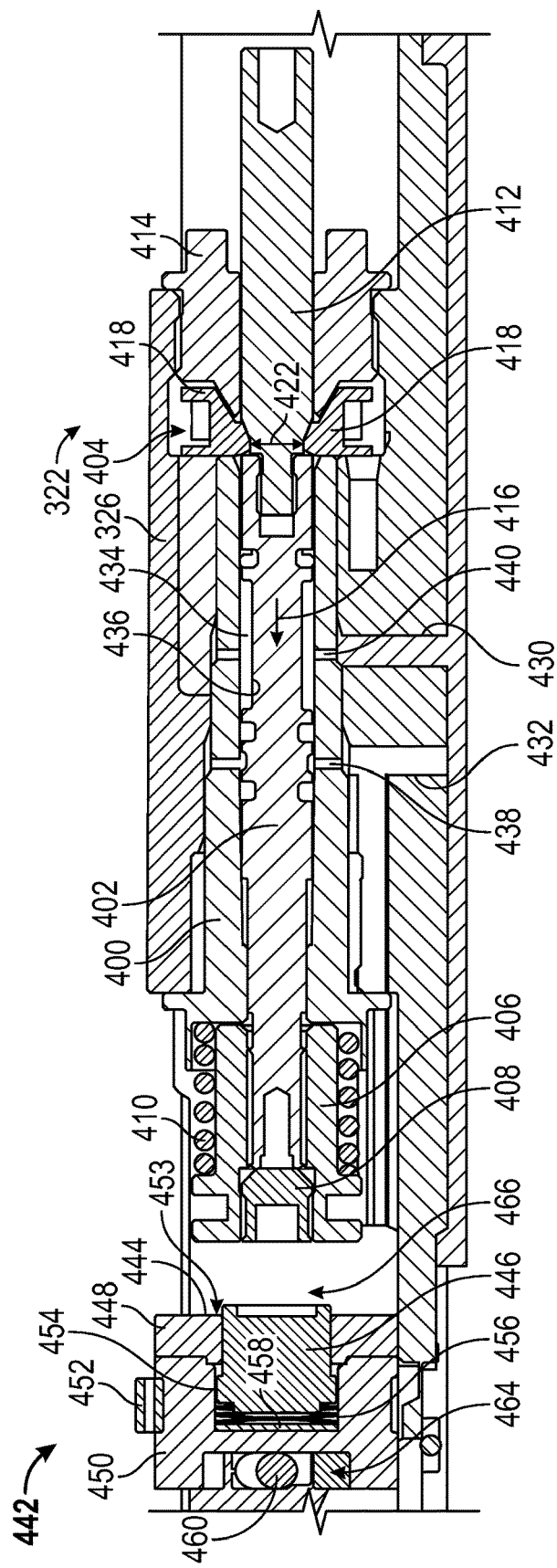
FIG. 4 is a cross-sectional view of an embodiment of a sample directing valve that may be employed in the sample collection system of FIG. 3, according to aspects of the present disclosure.
Figure 5:
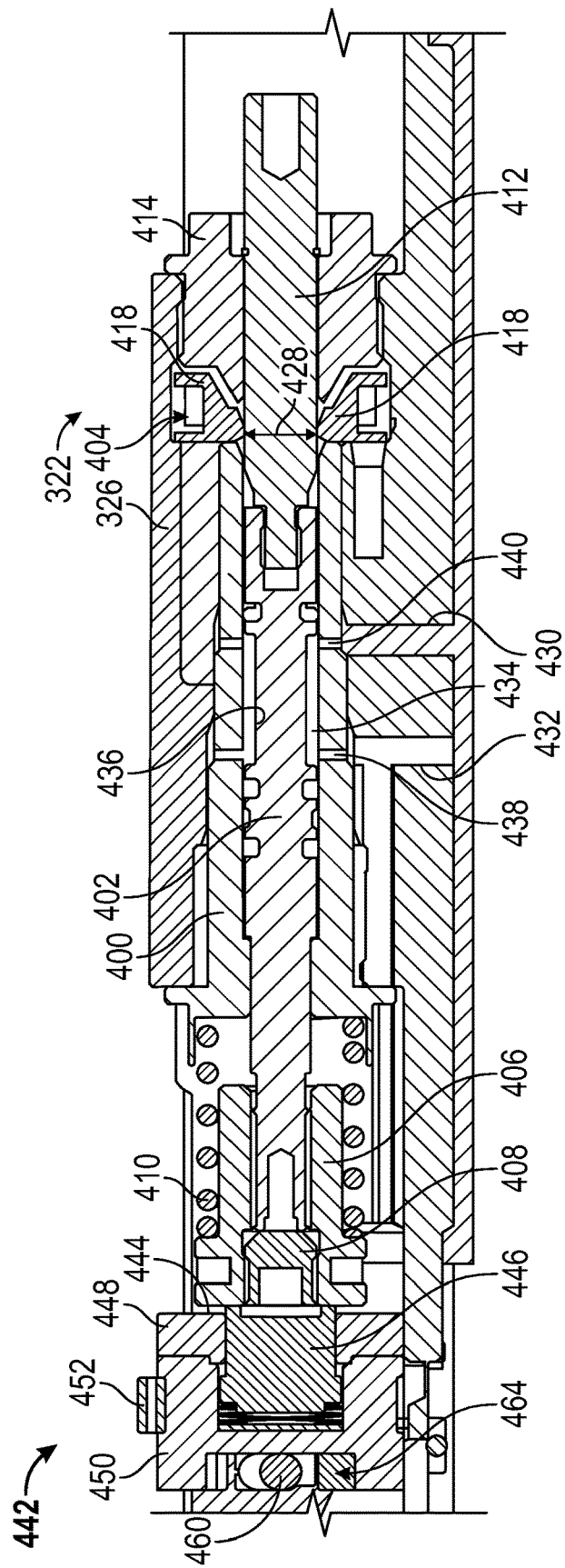
FIG. 5 is a cross-sectional view of the sample directing valve of FIG. 4 in the actuated position, according to aspects of the present disclosure.

FIGS. 4-9 depict embodiments of sample directing valves 322 and 324 with valve shift detection systems that may be disposed in a housing, such as the valve block 326. As shown in FIG. 4, the valve 322 is a normally closed valve; however, the embodiments depicted herein may also be applied to the normally open valves 324. The valve 322 includes a sleeve 400 that is coupled to the valve block 326. The valve 322 also includes a spool 402 that can slide in the sleeve 400 to isolate or open a flow path to a sample chamber 304. As shown in FIGS. 4 and 5, the spool 402 can slide to open the flow path of a normally closed valve 322. However, in other embodiments, the spool 402 may slide to close the flow path of a normally open valve 324. One end of the spool 402 extends towards or into a release washer 404, while the other end of the spool is fastened to a spring retainer 406 by a fastener 408, such as a lock nut. A spring 410 is disposed on the spring retainer 406. The end of the spool 402 that is adjacent the release washer 404 is enclosed by a cap 412 disposed through a port cover 414. When the valve 322 is disposed in the un-actuated position, the profile of the release washer 404 inhibits the cap 412 and connected spool 402 from moving in the direction of arrow 416, which would release tension in the spring 410 and slide the spool 402 within the sleeve 400.

Figure 10:
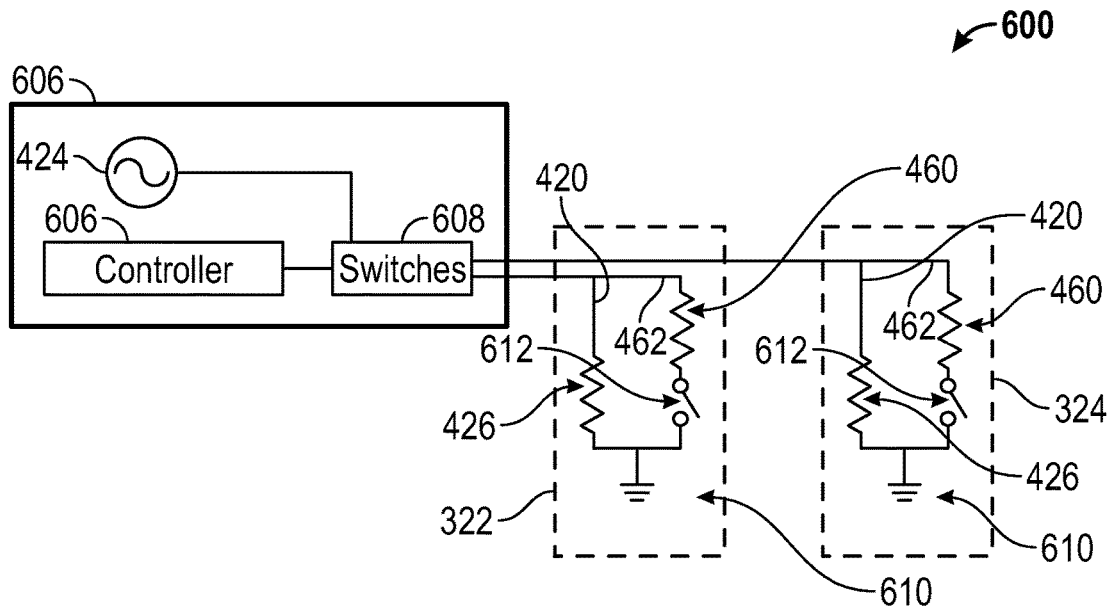
FIG. 10 is a schematic representation of an embodiment of an electronics system that may be employed in a valve shift detection system, according to aspects of the present disclosure.
Figure 11:
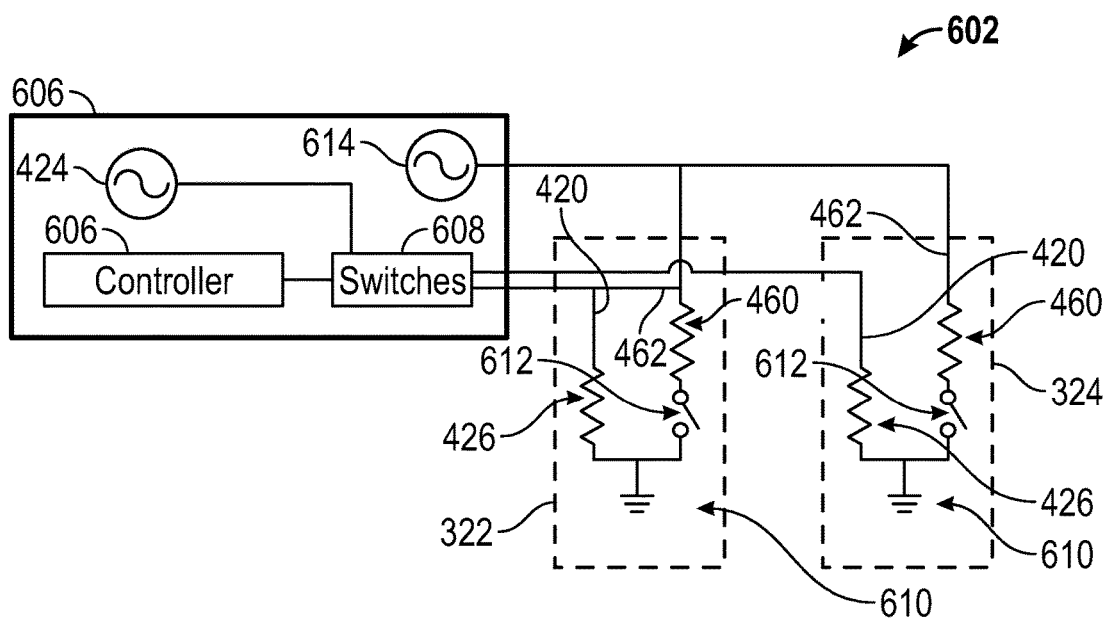
FIG. 11 is a schematic representation of another embodiment of an electronics system that may be employed in a valve shift detection system, according to aspects of the present disclosure.
Figure 12:
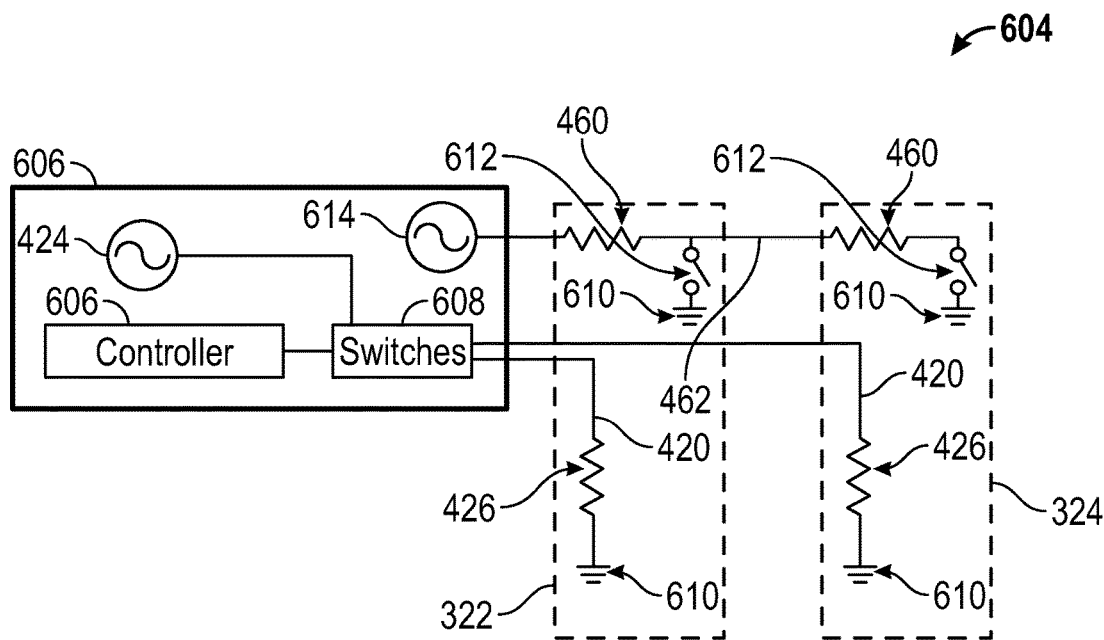
FIG. 12 is a schematic representation of a further embodiment of an electronics system that may be employed in a valve shift detection system, according to aspects of the present disclosure.

The release washer 404 includes segments 418 held in place by a wire 420, such as an exothermic wire (i.e. an "exo-wire"). The wire 420 is wrapped around the release washer segments 418 to hold the segments 418 together and provide a relatively small internal diameter 422 between the segments 418. The small internal diameter 422 inhibits movement of the cap 412, and connected spool 402, in the direction shown by the arrow 416. As shown in FIGS. 10-12, the wire 420 includes a resistor 426 that may be connected to a current source 424 within the downhole tool. To fire the valve 322, a current is passed through the wire 420 and the resistor 426. In response to the current, the resistor 426 increases in temperature, which melts a portion of the wire 420 (e.g., a hook or other component in the wire 420), allowing the segments 418 to move apart as shown in FIG. 5.

As shown in FIG. 5, when the segments 418 move apart, the internal diameter 422 increases to an enlarged diameter 428, which allows the cap 420 to move through the release washer 404. The spring 410 also expands, pulling the spool 402 in the direction shown by the arrow 416. The shifting of the spool 402 changes the flow path through the valve 322 and the valve block 326. For example, as shown in FIG. 4, the valve 322 is in the closed position prior to actuation. The valve block 326 includes flow paths 430 and 432, which are not fluidly connected through the valve 322 prior to actuation. The flow path 430 may receive fluid from the flowline 310 (FIG. 3), and the flow path 430 may direct fluid to a sample chamber 304. However, as shown in FIG. 4, the valve spool 402 blocks fluid from flowing between the flow paths 430 and 432 when the valve 322 is in the closed position. Accordingly, fluid is inhibited from flowing through the valve block 326 and into a sample chamber 304 when the valve is closed.

As shown in FIG. 5, when the valve 322 is actuated through heating of the wire 420, the spool 402 shifts in the direction of the arrow 416. When the spool 402 is shifted, the flow path 430 is connected to the flow path 432 through a chamber 434 formed by the sleeve 400 and a recessed portion 436 of the spool 402. In the actuated position where the spool has shifted, the chamber 434 aligns with flow paths 438 and 440 disposed in the sleeve 400. Accordingly, when the valve 322 is actuated, fluid may flow through the flow paths 430 and 440 to the chamber 434. From the chamber 434, the fluid may then flow through the flow paths 438 and 432 to a sample chamber 304 (FIG. 3). Accordingly, the normally closed valve 322 may be actuated to direct a sample of fluid to a sample chamber 304.

Once a sample has been collected in the sample chamber 304, a corresponding normally open valve 324 (FIG. 3) may be actuated to seal the sample in the chamber. Operation of the normally open valve 324 is similar to that of the normally closed valve 322. However, for the normally open valve 324, the position of the recessed portion 436 of the spool 402 and/or the position of the flow paths 438 and 440 in the sleeve 400 may be adjusted such that the when the valve is un-actuated, the recessed portion 436 aligns with the flow paths 438 and 440 and the flow paths 430 and 432. Accordingly, in the un-actuated position, fluid may flow from the flow path 430 through the valve 322 to the flow path 432, which may direct the fluid to a sample chamber 304. Upon actuation of the normally opened valve 324, the spool 402 may then shift so that the recessed portion 436 is no longer aligned with the flow paths 438 and 440, thereby closing the fluid path through the valve 324. According to certain embodiments, the normally open valve 324 may be actuated to seal a sample of the fluid within a sample chamber 304.

As described above with respect to FIGS. 3-5, the valves 322 and 324 may be actuated to collect fluid samples within the sample chambers 304. Should a normally closed valve 322 fail to actuate properly to open the flow path through the valve 322, fluid may not be collected within a sample chamber 304. Should a normally open valve 324 fail to actuate properly to close the flow path through the valve 324, fluid may not be retained within a sample chamber 304. Accordingly, valve shift detection systems may be included within each valve 322 and 324 to detect actuation of the valve. Although the valve shift detection systems are described herein with respect to a normally closed valve 322, the valve shift detection systems also may be disposed in a similar manner in a normally open valve 324.

FIGS. 4-7 depict an embodiment of a valve shift detection system 442 that may be included in the valves 322 and 324. As shown in FIGS. 4 and 5, the valve shift detection system 442 is disposed in a channel 444 of the valve block 326. The valve shift detection system 442 includes a switch component, such as a sensor button 446 disposed in first and second insulating bodies 448 and 450. The insulating bodies 448 and 450 may be constructed of a plastic or other suitable material designed to insulate the internal components of the valve shift detection system 442 from the valve block. As shown, the insulating bodies 448 and 450 include two separate components; however, in other embodiments, a single integral piece may be employed as the insulating body. A clamp 452 is coupled to the insulating body 450 to secure the valve shift detection system 442 within the valve block 326.

The sensor button 446 extends through an interior opening 453 of the first insulating body 448 and is disposed in a recess 454 of the second insulating body 450. A spring 456 is disposed between the sensor button 446 and a contact pad 458, which is also disposed within the recess 454. The spring 456 biases the sensor button 446 away from the contact pad 458 and towards the sleeve 400. A resistor 460 connected to a wire 462 is disposed in another recess 464 of the second insulating body 450, which is disposed on an opposite of the second insulating body 450 from the recess 454. The contact pad 458 extends into both recesses 464 and 454 and electrically couples the resistor 460 and wire 462 to the spring 456. The resistor 460, the wire 462, the spring 456, and the sensor button 446 form an open circuit that can be completed when the sensor button 446 contacts the valve 322. According to certain embodiments, the valve block 326, which is coupled to the valve 322, may provide the ground source for the circuit. As shown in FIG. 4, when the valve 322 is in the un-actuated position, a gap 466 exists between the sensor button 446 and the valve 322, which inhibits completion of the circuit. The sensor button 446 extends into the gap 466 and does not contact the valve 322 or the valve block 326. When the valve 446 is actuated as shown in FIG. 5, the spool 402 shifts towards the sensor button 446 (e.g., from the un-actuated position shown in FIG. 4 to the actuated position shown in FIG. 5), and the spring retainer 406, which is coupled to the spool 402, contacts the sensor button and closes the gap 466 to complete the circuit. Accordingly, the sensor button 446 may serve as a switch that is closed to complete the circuit when the sensor button 446 contacts the valve 322. The corresponding change in voltage, or current in other embodiments, that occurs upon completion of the circuit may be measured and used to detect shifting of the valve 322, as described further below with respect to FIGS. 9-11.

Figure 6:
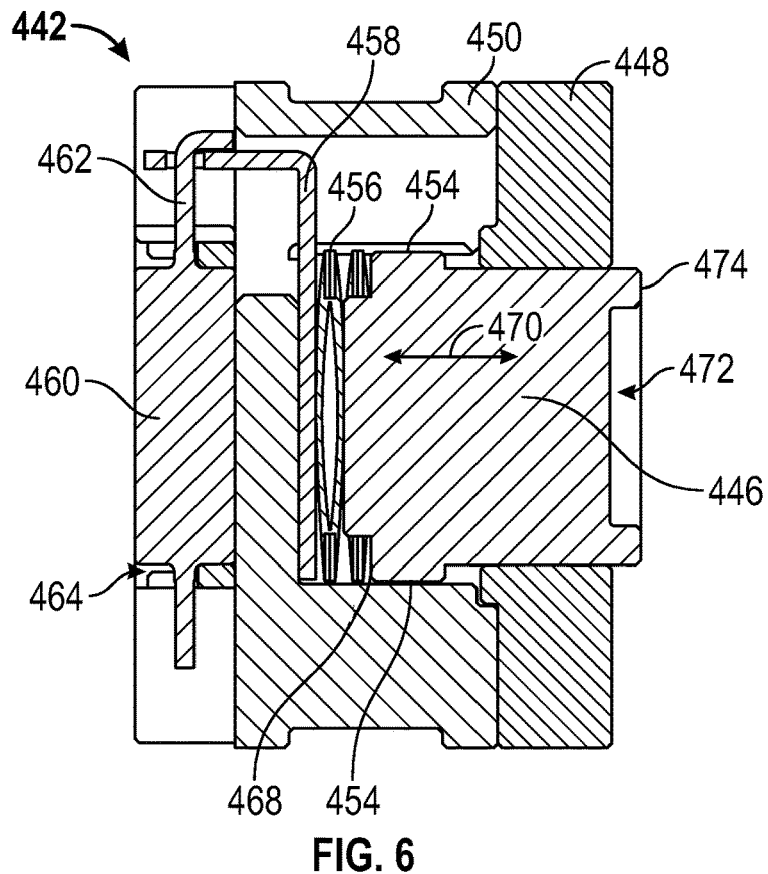
FIG. 6 is a cross-sectional view of an embodiment of a valve shift detection system that may be employed in the sample directing valve of FIGS. 4 and 5, according to aspects of the present disclosure.

FIG. 6 is a sectional view of the valve shift detection system 442. The resistor 460 extends within the recess 464 and is coupled to the contact pad 458 by the wire 462. The contact pad 458 is generally L-shaped and extends into the other recess 454 to contact the spring 456. The spring 456 abuts the sensor button 446 and encircles an end portion 468 of the sensor button 446. The sensor button 446 also includes a shoulder 470, of an enlarged diameter, that may abut the first insulating body 448 to inhibit removal of the sensor button 446 from the recess 454 as the spring 456 biases the sensor button 446 away from the contact pad 458 and towards the valve 322. The spring 456 allows the sensor button 446 to move axially within the recess 454 as shown by the arrow 470. The axial movement of the sensor button 446 may compensate for small variations in the length of the valve 322 and enable good contact between the sensor button 446 and the valve 322 upon actuation of the valve 322. The opposite end of the sensor button 446 from the end portion 460 includes a recess 472 surrounded by a lip 474 that contacts the spring retainer 406. In other embodiments, the surface geometry of the sensor button 446 may vary and for example, may include flat or curved surfaces that contact the valve 322. Further, the sensor button 446 may be designed to contact other portions of the valve 322, such as the fastener 408, among others.

Figure 7:
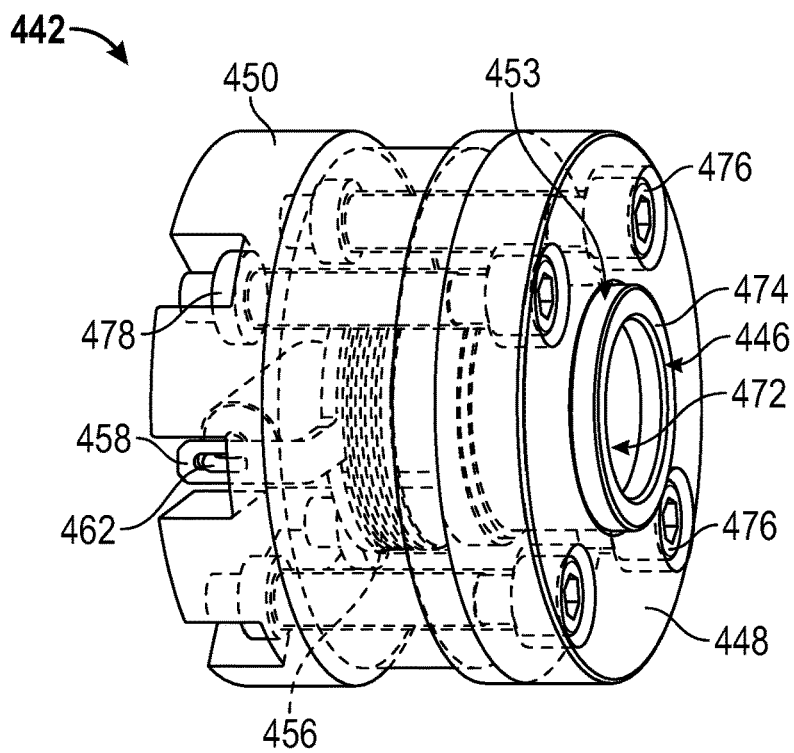
FIG. 7 is a perspective view of the valve shift detection system of FIG. 6, according to aspects of the present disclosure.

FIG. 7 is a perspective view of the valve shift detection system 442. Fasteners 476 extend through the first and second insulating bodies 448 and 450 to couple the insulating bodies 448 and 450 together. The fasteners 476 may be secured by nuts 478 or other suitable fixtures. However, in other embodiments, the first and second insulating bodies 448 and 450 may be replaced by a single insulating body and the fasteners 476 and nuts 478 may be omitted.

Figure 8:
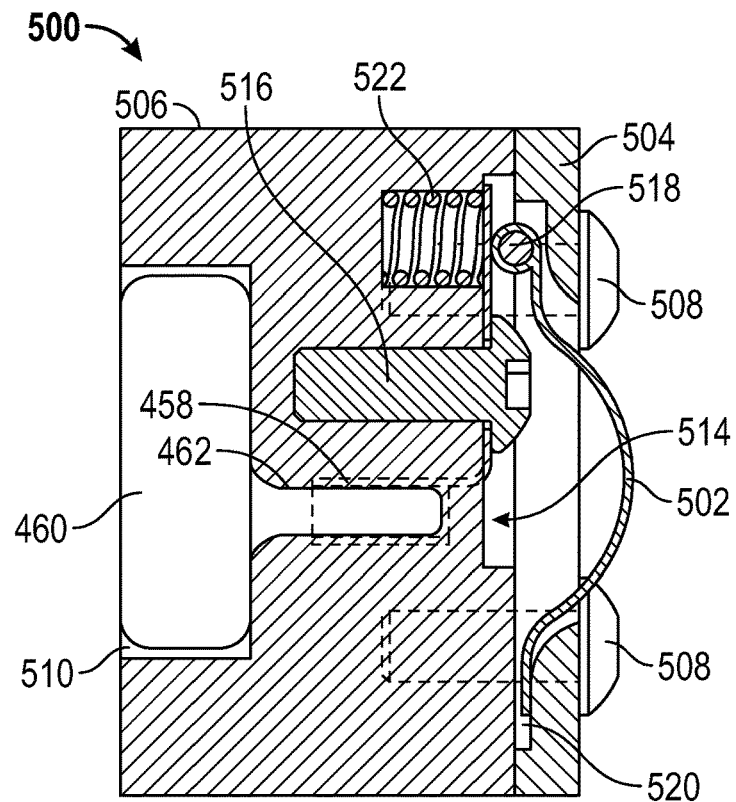
FIG. 8 is a cross-sectional view of another embodiment of valve shift detection system that may be employed in the sample directing valve of FIGS. 4 and 5, according to aspects of the present disclosure.
Figure 9:
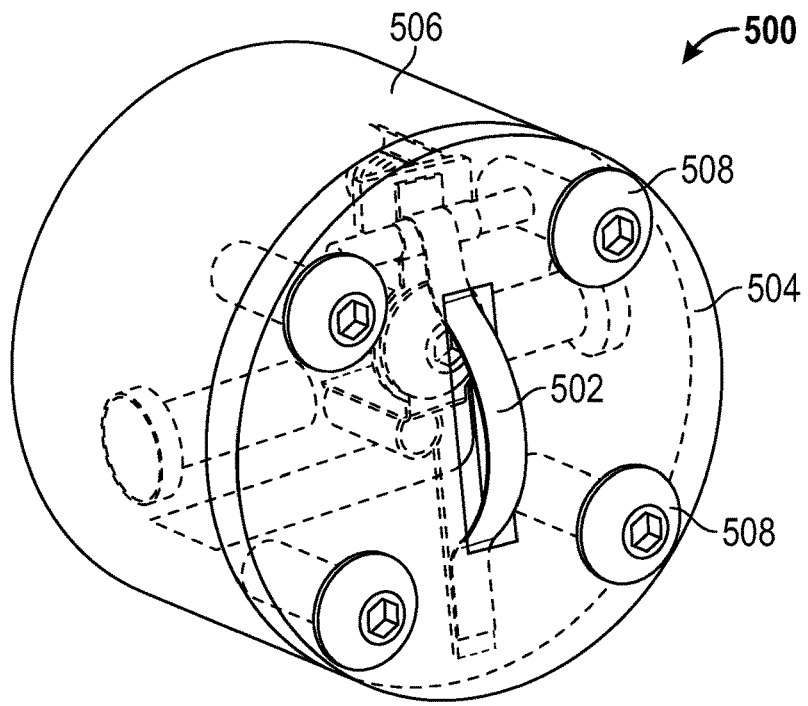
FIG. 9 is a perspective view of the valve shift detection system of FIG. 8, according to aspects of the present disclosure.

FIGS. 8 and 9 depict another embodiment of a valve shift detection system 500 that may be employed in the valves 322 and 324. Rather than a sensor button, the valve shift detection system 500 includes a switch component, such as a spring contact 502 that comes into contact with the valve 322 upon actuation of the valve 322. For example, the spring contact 502 may be designed to contact the spring retainer 406 or the fastener 408 of the valve 322 when the spool 402 shifts. The spring contact is disposed within first and second insulating bodies 504 and 506 that are coupled together by fasteners 508, such as screws. In other embodiments, the first and second insulating bodies 504 and 506 may be replaced by a single insulating body.

The second insulating body 506 includes a recess 510 that houses the resistor 460. The wire 462 electrically couples the resistor 460 to a contact pad 516 that is electrically coupled to the spring contact 502. The contact pad 516 is disposed within another recess 514 in the second insulating body 506, which is disposed on an opposite side of the second insulating body 506 from the recess 510. A fastener 516 may secure the contact pad 512 to the second insulating body 506. At one end, the spring contact 502 may be secured to a rod 518 disposed within the insulating bodies 504 and 506, while the other end of the spring contact 502 may be inserted into a slot 520 within the first insulating body 504. A spring 522 also may abut the contact pad 512 to bias the contact pad 512 and the spring contact 502 towards the valve 322.

FIGS. 10-12 depict embodiments of electronics systems 600, 602, and 604 that may be employed in the valve shift detection systems 442 and 500. The electronics systems 600, 602, and 604 each include a drive board 606 that contains the current source 424, a controller 606, and switches 608. The drive board 606 may be disposed within the sampling modules 132, 222, and 224 (FIGS. 1 and 2), or within other modules of the downhole tools. The controller 606 may govern actuation of the valves 322 and 324, through operation of the switches 608, which may be employed to provide current to the resistors 426 of the release washers 404 to actuate the valves 322 and 324. According to certain embodiments, the controller 606 may include one or more processors and/or control circuitry that executes coded instructions, which may be stored within a memory, to govern actuation of the valves 322 and 324.

The drive board 606 is electrically coupled to the valves 322 and 324. For ease of illustration, each drive board 606 is electrically coupled to two valves 322 and 324; however, as may be appreciated, each drive board 606 may be coupled to any number of valves 322 and 324. The drive board 606 includes the current source 424 (e.g., a constant current source), which provides current to the valves 322 and 324. However, in other embodiments, the current source may be replaced by a voltage source. Further, in certain embodiments, additional components, such as analog to digital converters and over voltage protectors, among others, may be included in the drive boards 606.

As shown in FIG. 10, the current source 424 provides current to both the release washer resistors 426 and the shift detection resistors 460, such that a release washer resistor 426 and a shift detection resistor 460 are included on the same circuit. Each valve 322 and 324 includes a circuit ground 610, which as described above with respect to FIGS. 4-9 may be the valve block 326. Each valve 322 and 324 also includes a valve shift detection switch 612 designed to close upon shifting of the valve 322 and 324. As described above with respect to FIGS. 4-9, the switch 612 may include a switch component, such as the sensor button 446 or the spring contact 502, that contacts the valve 322 or 324 to close the switch.

FIGS. 11 and 12 depict electronics systems 602 and 604 that are generally similar to the electronics system 600 of FIG. 10. However, rather than including a single current source 424 for both the release washer resistor 426 and the valve shift detection resistor 460, the drive board 606 includes a separate current source 614 for the valve shift detection resistors 460. The valve shift detection resistors 460 may be disposed in parallel as shown in FIG. 11, or the valve shift detection resistors 460 may be disposed in series as shown in FIG. 12. The electronics systems described above with respect to FIGS. 10-12 are provided by way of example, and are not intended to be limiting. As may be appreciated, various circuitry arrangements may be employed to govern operation of the valves 322 and 324.

Figure 13:
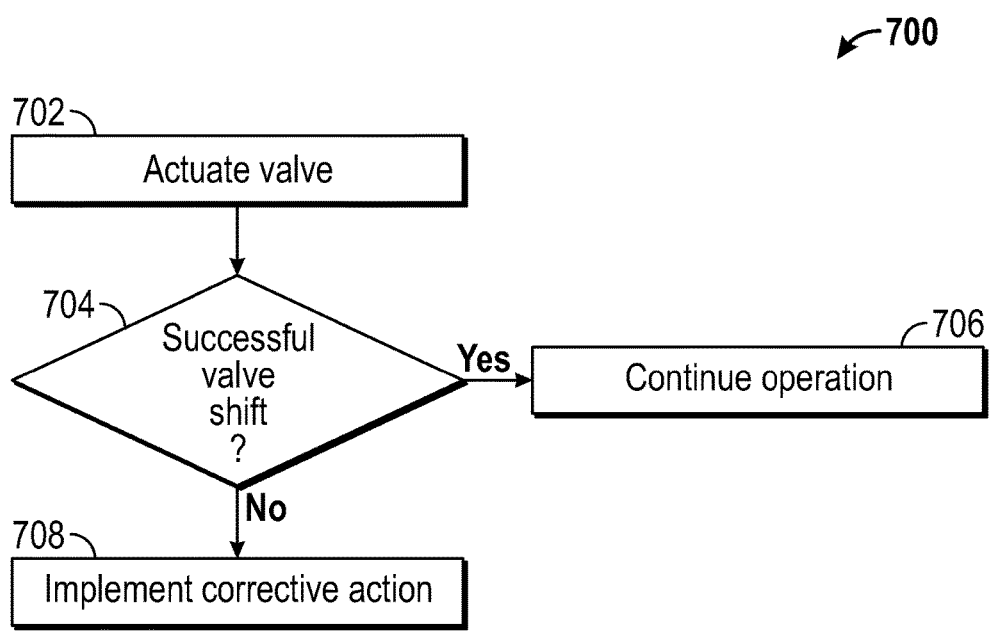
FIG. 13 is a flowchart depicting an embodiment of a method for employing a valve shift detection system, according to aspects of the present disclosure.

FIG. 13 is a flowchart depicting a method 700 that may be employed to operate the valve detection systems described herein. The method 700 may begin by actuating (block 702) a valve, such as the valve 322 or 324. For example, the controller 606 may govern operation of the switches 608 to provide current from the current source 424 to a certain valve 322 or 324. As shown in FIGS. 4 and 5, in response to the current, the resistor 426 increases in temperature, which melts a portion of the wire 420, allowing the segments 418 to move apart as shown in FIG. 5. Further, upon actuation, when the wire 420 melts the releaser washer 426 may be electrically uncoupled from the ground 610 or the drive board 606.

The method may continue by determining (block 704) if the valve has shifted successfully in response to the actuation. For example, as shown in FIGS. 4 and 5, upon successful actuation of the valve, the spool 402 shifts in the direction of the arrow 416, which in turn causes the sensor button 446 to contact the valve 322 to complete the circuit. The completion of the circuit may produce a voltage change that the controller 606 (FIGS. 10-12) may detect to identify a successful valve shift. In other embodiments, the controller 606 may detect a current change to identify a successful valve shift. Further, in certain embodiments, the controller 606 may identify a successful valve shift by determining whether a voltage change or current change exceeds a certain value.

In response to determining (block 704) that a successful valve shift has occurred, operation of the downhole tool may continue (block 706). For example, a sampling operation may proceed as planned with the downhole tool moving to the next station and/or with the controller 606 proceeding to open or close another valve. However, if a successful valve shift is not detected (block 704), corrective action may be applied (block 708). In an unsuccessful valve shift, the valve spool 402 may not properly be released to shift in the direction of the arrow 416, as shown in FIGS. 4 and 5. For example, the wire 420 may not melt enough to allow the segments 418 to expand as shown in FIGS. 4 and 5. Accordingly, the flow path through the valve, described above, may not properly open or close. If the spool 402 fails to shift, the valve may not contact the sensor button 446. Accordingly, the circuit may not be completed and a voltage or current change may not be produced, and therefore may not be detected. In response to determining (block 704) that a successful valve shift has not occurred, the controller 606 may implement (block 708) corrective action. For example, the controller 606 may govern operation of the switches 608 to re-supply current to the same valve in an attempt to actuate the valve. In another example, the controller 606 may transmit a signal to cause the downhole tool to take another sample at the current station. The controller 606 may then route the sample fluid to another sample chamber 304 by actuating a different valve, or a different set of valves 322 and 324.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A valve system comprising:
a valve disposed in a housing and comprising a spool moveable from an un-actuated position to an actuated position in response to actuation of the valve; and
a valve shift detection system comprising a circuit electrically isolated from the valve in the un-actuated position and electrically coupled to the valve in the actuated position;
wherein the valve shift detection system comprises a contact switch disposed in a first recess of an insulating body and comprises a resistor disposed in a second recess of the insulating body, wherein the first and second recesses are disposed on opposite sides of the insulating body.

2. The valve system of claim 1, wherein the switch component comprises a sensor button biased towards the valve by a spring.

3. The valve system of claim 1, wherein the housing comprises a valve block, and wherein the valve shift detection system comprises one or more insulating bodies disposed in a channel of the valve block to electrically isolate the circuit from the valve.

4. A valve system comprising:
a valve disposed in a housing and comprising a spool moveable from an un-actuated position to an actuated position in response to actuation of the valve; and
a valve shift detection system comprising a circuit electrically isolated from the valve in the un-actuated position and electrically coupled to the valve in the actuated position;
wherein the valve comprises a sleeve disposed around the spool, and wherein the spool is slidable within the sleeve, toward the valve shift detection system, in response to the actuation of the valve, and wherein the valve comprises a spring retainer coupled to the spool and moveable to contact the valve shift detection system in the actuated position.

5. A valve system comprising:
a valve disposed in a valve block and comprising a spool moveable from an un-actuated position to an actuated position in response to actuation of the valve; and
a valve shift detection system comprising a switch component, wherein the switch component is spaced from the valve by a gap when the valve is in the un-actuated position, and wherein the switch component contacts the valve to complete a circuit and close the gap when the valve is in the actuated position;
wherein the spool is retained by a release washer when the valve is in the un-actuated position, and wherein the spool is shifted away from the release washer when the valve is in the actuated position.

6. The valve system of claim 5, wherein the valve comprises a spring configured to shift the spool away from the release washer when the valve is in the actuated position, and wherein the spring is disposed around a spring retainer that contacts the switch component when the valve is in the actuated position.

7. The valve system of claim 5, wherein the valve shift detection system further comprises:
first and second insulating bodies coupled to one another; and
a resistor disposed in a first recess of the second insulating body;
wherein the switch component is disposed in a second recess of the second insulating body and extends through the first insulating body.

8. The valve system of claim 7, wherein the valve shift detection system further comprises:
a contact pad electrically coupled to the resistor; and
a spring disposed in the second recess between the contact pad and the switch component to bias the switch component towards the valve and to electrically couple the contact pad to the switch component.

9. The valve system of claim 5, wherein the valve shift detection system further comprises:
first and second insulating bodies coupled to one another; and
a resistor disposed in a first recess of the second insulating body;
a contact pad disposed in a second recess of the second insulating body and electrically coupled to the resistor;
wherein the switch component is electrically coupled to the contact pad and extends into a slot of the first insulating body.

10. A method comprising:
actuating a valve to move a spool from an un-actuated position to an actuated position within a housing; and
detecting a successful shift of the spool to the actuated position based on a voltage change or a current change produced by a spring retainer contacting a valve shift detection system;
wherein actuating the valve comprises supplying current to a resistor of a release washer retaining the spool.

11. The method of claim 10, wherein actuating the valve comprises shifting the spool toward the valve shift detection system disposed in a housing of the valve.

12. The method of claim 10, wherein detecting the successful shift of the spool comprises detecting the current change or the voltage change produced by a switch component contacting the valve.

13. The method of claim 10, wherein actuating the valve comprises supplying current from a first current source to a release washer resistor retaining the spool, and wherein detecting the successful shift comprises supplying current from a second current source to a valve shift detection resistor.

14. The method of claim 13, wherein the valve shift detection resistor is disposed in series with another valve shift detection resistor of another valve disposed within the housing.

15. The method of claim 13, wherein the valve shift detection resistor is disposed in parallel with another valve shift detection resistor of another valve disposed within the housing.

* * * * *